United States Patent [19]

Roberts

[11] Patent Number: 5,439,725

[45] Date of Patent: Aug. 8, 1995

[54] FLOOR MAT FOR AN OVERLAND VEHICLE

[75] Inventor: John K. Roberts, Sheboygan, Wis.

[73] Assignee: Masland of Wisconsin, Inc., Sheboygan, Wis.

[21] Appl. No.: 49,848

[22] Filed: Apr. 20, 1993

[51] Int. Cl.⁶ .......................... B32B 3/02; B32B 7/02; B62D 25/20
[52] U.S. Cl. ..................................... 428/95; 428/174; 428/187; 428/213; 296/97.23
[58] Field of Search ............... 296/97.23; 428/95, 187, 428/174, 213

[56] References Cited

U.S. PATENT DOCUMENTS

| | | | |
|---|---|---|---|
| 2,292,103 | 8/1942 | Cotterman | 154/1 |
| 2,810,672 | 10/1957 | Taylor | 154/49 |
| 2,850,423 | 9/1958 | Kramp et al. | 154/127 |
| 3,003,576 | 10/1961 | Dodge | 296/97.23 |
| 3,310,422 | 3/1967 | Petry | 428/187 |
| 3,337,258 | 8/1967 | Steinberg | 161/89 |
| 3,360,422 | 12/1965 | Desch | 296/1 |
| 3,379,560 | 4/1968 | Tharp | 428/187 |
| 3,585,099 | 6/1971 | Van Buskirk | 428/90 |
| 3,673,034 | 6/1972 | Squier | 156/222 |
| 4,012,544 | 3/1977 | Richards | 428/95 |
| 4,016,318 | 4/1977 | DiGioia et al. | 428/95 |
| 4,242,395 | 12/1980 | Zuckerman et al. | 428/96 |
| 4,247,756 | 1/1981 | Cucinotta et al. | 219/528 |
| 4,336,293 | 6/1982 | Eiden | 428/143 |
| 4,337,614 | 3/1983 | Alfter et al. | 428/213 |
| 4,377,614 | 3/1983 | Alfter et al. | 428/213 |
| 4,554,995 | 11/1985 | Schlack | 182/129 |
| 4,644,592 | 2/1987 | Small | 428/187 |
| 4,671,981 | 6/1987 | Mclaughlin | 428/95 |
| 4,673,603 | 6/1987 | Roth | 428/85 |
| 4,804,567 | 2/1989 | Reuben | 428/40 |
| 4,828,898 | 5/1989 | Bailey | 428/95 |
| 5,023,433 | 6/1991 | Gordon | 219/548 |
| 5,059,474 | 10/1991 | Yoshida | 428/81 |
| 5,254,384 | 10/1993 | Gordon | 296/97.23 |

FOREIGN PATENT DOCUMENTS

| | | | |
|---|---|---|---|
| 221945 | 9/1987 | Japan | 296/97.23 |
| 213442 | 9/1991 | Japan | 296/97.23 |
| 2118035 | 10/1983 | United Kingdom | 428/95 |
| 2203598 | 10/1988 | United Kingdom | 296/97.23 |

OTHER PUBLICATIONS

Miles Kimball Company; Dec. 1990 Catalog; p. 58.

Primary Examiner—George F. Lesmes
Assistant Examiner—Terrel Morris
Attorney, Agent, or Firm—Godfrey & Kahn

[57] ABSTRACT

A floor mat for an overland vehicle which includes, in a first form, a pair of polymeric based sheets which are joined together and which have individually unique filler contents, as well as predetermined thickness dimensions; in a second form, the invention includes, the features of the first form, and further includes a carpet having a predetermined surface texture which is fixed on the top surface of the uppermost polymeric based sheet, and wherein the uppermost polymeric based sheet has an appearance which visually imitates the surface texture of the carpet such that the entire floor covering appears to be uniform; in a third form, the invention includes a floor mat having a polymeric based sheet having a moderate fill content and which has portions of its upper facing surface painted thereby visually imitating a fabricated colored polymeric based sheet. Alternate forms of the invention further include an improved dash absorber and integrally formed electrical conduits which facilitate the routing of electrical signals to remote subassemblies in the vehicle.

15 Claims, 7 Drawing Sheets

FLOOR MAT FOR AN OVERLAND VEHICLE

1. FIELD OF THE INVENTION

The present invention relates to an improved floor mat or floor covering, and more particularly to an improved covering for the floorboard of an overland vehicle.

2. DESCRIPTION OF THE PRIOR ART

In the production of overland vehicles, such as automobiles and trucks, the overall price of the vehicle is affected by the cost of its individual parts and subassemblies, as well as the cost of the labor to assemble the vehicles. Accordingly, a meaningful reduction in the total cost of a vehicle may be achieved if the cost of parts or labor is reduced.

Presently, a preponderance of non-carpeted vehicle floor mats are manufactured from colored "polymeric based" sheets which are approximately 0.080 inches thick and typically have a low filler content. It should be understood that the price of these colored sheets is directly related to the resin costs, the filler content of the sheet, the color of the sheet, and the cost of other additives such as plasticizers and stabilizers which are used to produce the respective sheets. For example, the price of the PVC (polyvinylchloride) used to manufacture colored vehicle floor mats is roughly 50% to 60% higher than the PVC which is used to produce vehicle acoustic insulation dash barriers. These dash barriers are typically produced from high filler content PVC which has an inexpensive black color additive. A significant reduction in the cost of producing a floor covering may be achieved, therefore, if the floor covering is manufactured from inexpensively colored, moderate to high filler content PVC. However, to be marketable, this floor covering must be as aesthetically pleasing and as durable as the more expensive low filler content sheets. It should be understood that the term "filler" refers to an inert mineral powder of rather high specific gravity (2.00–4.50) such as calcium carbonate which is used in the manufacture of plastic products to reduce cost.

It is well known in the automobile and truck industry to use fully carpeted floor coverings to create a plush, aesthetically pleasing appearance for the passenger compartment. However, fully carpeted floor coverings are much more expensive than corresponding synthetic "polymeric based" floor coverings because of the raw material cost of the carpet. Further, fully carpeted floor coverings rapidly lose their showroom appearance due to their exposure to road dirt, mud, solar radiation and, salt, for example. Therefore, a floor covering which utilizes less carpet than typical carpeted floor coverings, but which also creates a similar plush, aesthetically pleasing interior appearance and which would retain its showroom appearance, would be advantageous.

The cost of manufacturing an automobile is affected to some degree by the number and complexity of the parts or other subcomponents which are assembled into the final product. For example, in the assembly of that portion of the overland vehicle which is located in the vicinity of the subjacent areas of the dash, fire wall, and adjacent areas including the floor, it has long been the practice of manufacturers to fabricate various adjacent but unrelated parts, such as dash acoustic absorbers, floor mats, and wire harnesses, in completely separate manufacturing operations and thereafter assemble them into a finished product. Further, and as should be understood, the number of electronic or electrically actuated components in vehicles has continued to increase in number and complexity and therefore there has been a corresponding increase in the size, weight, and complexity of the wire harnesses and their associated connectors. This has, of course, created a whole range of problems relative to the design of the dash barriers, as well as adjacent structures such as the sheet metal firewall and floorpan.

As a general matter, wire harness technology has remained essentially unchanged for decades. For example, most wire harnesses are still laboriously assembled by hand or in bulky and complicated machines. Further, it should be understood that a specific wire harness design cannot be completed until the design and placement of every electrical component in the vehicle has been determined. Consequently, the configuration of each wire harness changes as the vehicle design nears completion. It should be understood, therefore, that proposed design changes in the dash and subjacent portions of the automobile directly affect the wire harness configuration and routing of same around the various components mounted in the dash.

The prior art is replete with assorted patents and other literature which propose various solutions to the problems related to the size and complexity of wire harnesses. For example, technology exists which permits electrical signals to be multiplexed that is, it permits many different electrical signals to be carried on a single pair of wires. Further, some electrical connections can be made by utilizing small flexible circuit boards which eliminate many of the short wires which are sometimes present in the vicinity of the instrument cluster. Finally, fiber optic technology may reduce the number of wires in a wire harness by eliminating many of the light bulbs which are now employed to light the clusters of instruments used in the dash area of the vehicle.

While the utilization of multiplexing and fiber optic technologies provide some answers to the problems related to the complexity of wire harnesses, they often have significant shortcomings which have detracted from their usefulness. For example, these same technologies are most often useful in combination with instruments which are utilized in low power signal and control functions for various subassemblies. Furthermore, in those instances where these same subassemblies require a significant amount of electrical power, heavier conductive bundles for delivering this electricity to these instruments will still be necessary, and will be subsequently routed in the associated wire harnesses. Fiber optics, in particular, conveys little power at all and must rely upon conductive harnesses to deliver same. Furthermore, and as should be understood, the use of fiber optic technology as well as multiplexing architectures assume a relatively high degree of system integration, or at least compatibility. In most instances, automobile manufacturers have not integrated the various electronic components of their vehicle design to the extent necessary to employ this type of technology.

While previous vehicle floormats, dash acoustic absorbers and various wire harnesses have operated with various degrees of success, the complexity of the wire harness and installation of the floor mat and dash acoustic absorbers have sometimes been quite difficult and has from time to time required some level of expertise on the part of production line workers to install these same parts. The difficulty in installation is usually a result of the lack of space in the vehicle within which to maneuver the bulky components. As a general matter, as space decreases the time necessary to install these components generally increases. As should be understood, and as noted above, some increased space and flexibility relative to the wire harness may be achieved by reducing the number of wires required in the wire harness. Further, profitability would be increased by reducing the number of parts that would need to be maintained and installed by production line workers. Still further, increased design flexibility will be experienced by utilizing new technologies such as flexible circuit boards inasmuch as such circuit boards are easy to design, prototype, and manufacture with automated systems. This is in contrast with the conventional wire harnesses which are assembled by hand.

Therefore, it will be seen that the prior art vehicle flooring, dash acoustic absorbers, and other assemblies which are individually assembled into the subjacent portions of the dash and related areas of the overland vehicle, do not balance the practical needs of the automotive industry and the interrelated parameters of efficiency, and cost-effectiveness, which are particularly critical to maintaining the profitability of manufacturing such vehicles.

Therefore, it has long been known that it would be desireable to have an improved floor mat for an overland vehicle which addresses the concerns noted above and which, in a first form of the invention, provides a means for increasing the cost effectiveness of the floor mat by providing a first colored polymeric based sheet having a low filler content and a predetermined thickness dimension, wherein the first sheet has a top surface and an opposite, bottom surface; and a second polymeric based sheet having a moderate filler content and a predetermined thickness dimension which is at least twice that of the first sheet, wherein the second sheet is made integral with the bottom surface of the first sheet. In addition to the foregoing, and in one form of the invention, a dash acoustic absorber may operate in combination with the floor mat and can further include a wire harness which is made integral with the dash absorber and/or floor mat for conducting various electronic signals about the overland vehicle to assorted components thereof. In another form of the invention, the apparatus includes a polymeric based sheet having a predetermined thickness dimension and top and bottom surfaces, wherein the top surface includes at least one abrasive wear zone, and a second hidden zone which is disposed in a position underneath the operators seat; and a coating of paint is applied to all areas of the top surface of the polymeric based sheet with the exception of the hidden zone. Alternative forms of the invention may further include a dash acoustic absorber and integrated wire harness to provide a unitary assembly for conducting electronic signals about the automobile, thereby reducing the complexity of a related wire harness. Additionally, and in still another form of the invention, the above described invention may further include a carpet which is disposed on and about the tunnel region of the overland vehicle and which defines the transmission housing, and wherein the carpet in one embodiment may be affixed on the top surface of the floor mat, and in a second form may be attached on the floor mat along its respective peripheral edge. In still another form of the invention, the top surface of the floor mat may be embossed or otherwise manufactured in a fashion whereby it visually imitates the surface texture of the carpet such that the entire floor mat, from a distance, appears carpeted.

3. OBJECTS AND SUMMARY OF THE INVENTION

Therefore it is an object of the present invention to provide an improved floor mat.

Another object of the present invention is to provide an improved floor mat which has particular utility when utilized in combination with a dash acoustical absorber, or similar assembly.

Another object of the present invention is to provide in one form of the invention, an improved floor mat which includes a carpet member which covers the tunnel area of the overland vehicle and which defines the transmission housing, the floor mat having an exterior surface which visually simulates the surface texture of the carpet such that the entire floor mat appears uniform to a casual observer.

Another object of the present invention is to provide, in one form of the invention, an improved floor mat which includes at least one electrical conduit which is made integral with the floor mat or with the associated dash acoustic absorber and which transmits electrical signals to remote locations in the overland vehicle.

Another object of the present invention is to provide, in one form of the invention, an improved floor mat which is formed of a first polymeric based sheet having a predetermined color, other than black, a low filler content, and a predetermined thickness dimension; and a second polymeric based sheet which is made integral with the first polymeric based sheet and which has a thickness dimension which is greater than the first polymeric based sheet, and a filler content greater than the filler content of the first polymeric based sheet.

Another object of the present invention is to provide, in one form of the invention, an improved floor mat which includes a polymeric based sheet having an outwardly facing surface, and which is covered with a coat of paint, and wherein the polymeric based sheet further includes an abrasive wear zone, and a second hidden zone which is disposed underneath the seat of the overland vehicle, and wherein the coat of paint is applied to all areas of the floor mat with the exception of the hidden zone.

Another object of the present invention is to provide, in one form of the invention, an improved floor mat which includes an abrasive wear zone, and a second, hidden zone disposed underneath the seat of the overland vehicle, and wherein a coat of paint is applied to the floor mat to all areas of the floor mat with the exception of the second zone, and wherein the coat of paint applied to the abrasive wear zone has a thickness dimension greater than the thickness dimension of the paint layer applied to the remaining areas of the floor mat.

Another object of the present invention is to provide an improved floor mat which is operable to obtain the individual benefits to be derived from related prior art floor mats for overland vehicles while avoiding the detriments individually associated therewith.

Another object of the present invention is to provide an improved floor mat which reduces the number of parts which are necessary to assemble the floor and subjacent portions of the dash area of an overland vehicle and which further reduces the expenses of assembling same.

Another object of the present invention is to provide an improved floor mat which can be manufactured using existing technology for the purpose of further increasing the efficiency with which a given number of floor mats can be produced during a predetermined manufacturing cycle.

Another object of the present invention is to provide an improved floor mat which is characterized by ease of employment, simplicity of construction, and which further can be sold at a relatively moderate price when compared with prior art assemblies which are utilized for substantially identical purposes.

Further objects and advantages are to provide improved elements and arrangements thereof, in the various forms of the improved floor mats which are disclosed, and which are dependable, economical, durable and fully effective in accomplishing their intended purposes.

5. DESCRIPTION OF THE PREFERRED EMBODIMENT

First Form

Figure 1:
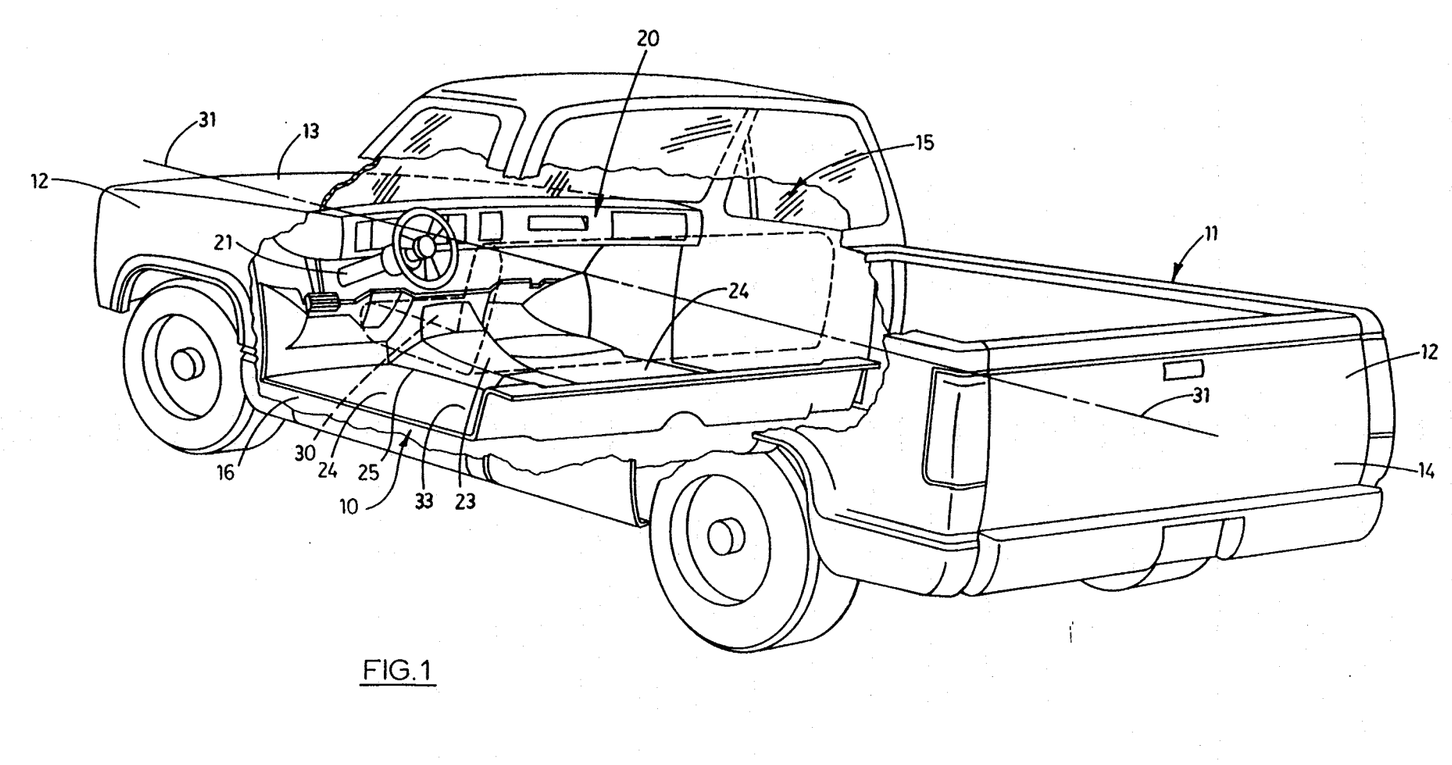
FIG. 1 is a perspective, environmental view of one form of the present invention, shown in an installed configuration in a light truck, and with some supporting surfaces and structures of the truck removed to show the structure thereunder.
Figures 3, 4, 5:
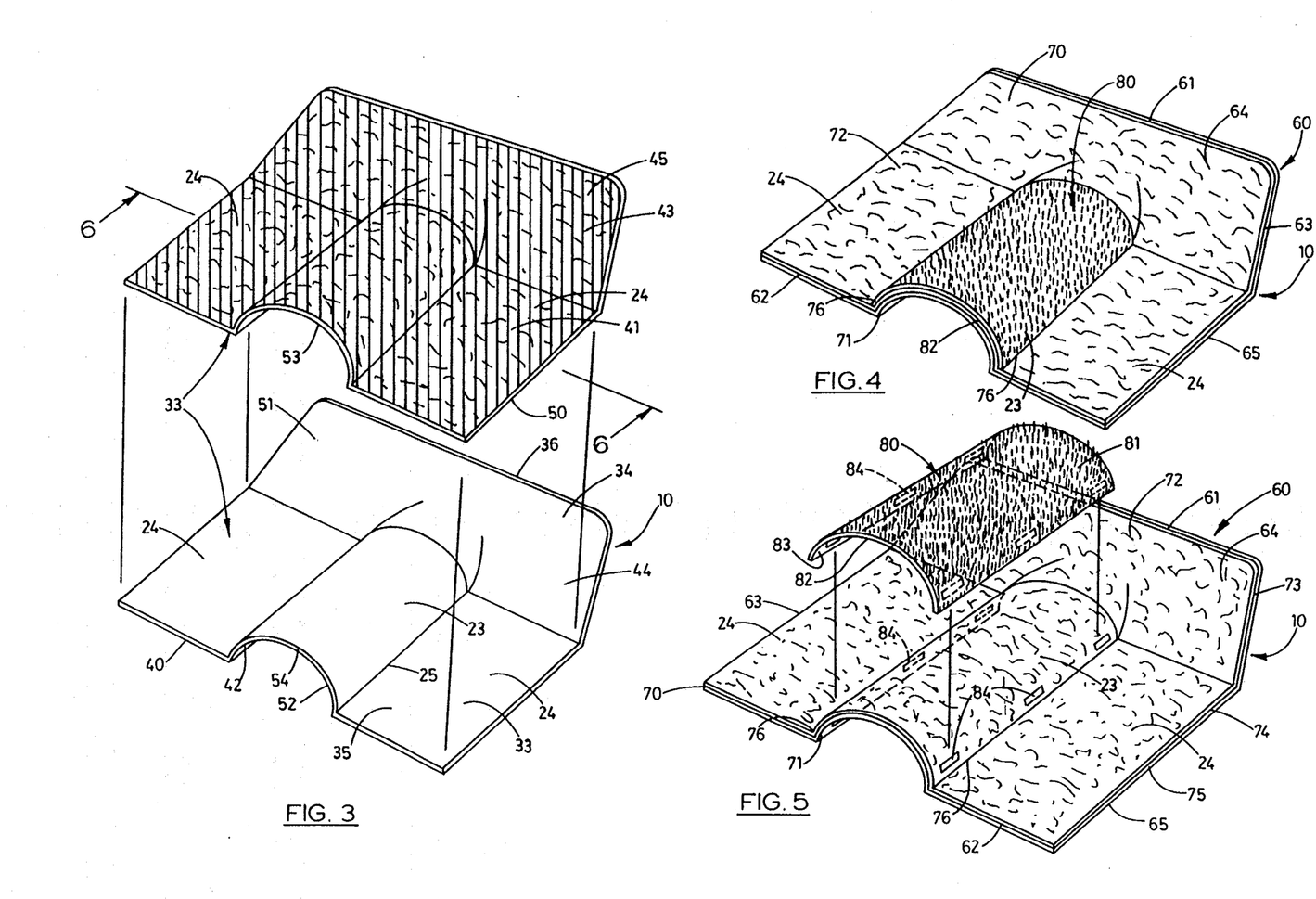
FIG. 3 is a partial, perspective, exploded, generally plan view of one form of the improved floor mat of the present invention, and showing a colored floor mat.
FIG. 4 is a partial, perspective, plan view of one form of the improved floor mat of the present invention, and showing a floor mat which includes a carpeted tunnel region.
FIG. 5 is a partial, perspective, plan view of one form of the improved floor mat of the present invention, and showing a floor mat which includes a carpeted tunnel region, and wherein the carpeted tunnel region is releasable from the underlying floor mat.

The first form of the present invention is generally indicated by the numeral 10 in FIGS. 1 and 3. As best understood by a study of FIG. 1, the improved floor mat of the present invention finds particular utility when installed in an overland vehicle 11 such as that which is depicted in FIG. 1 and which is shown as a light truck. However, the present invention may also be installed in assorted other overland vehicles such as sedans and the like. The overland vehicle depicted is of conventional design, that is, it has a chassis or body 12 which is operable for movement across the surface of the earth. The chassis or body 12 has a front or forward portion 13 and an opposite, rearward portion 14. The chassis or body defines a passenger compartment 15 which has a floor area 16 which supports an operator's seat, which is not shown.

Figure 2:
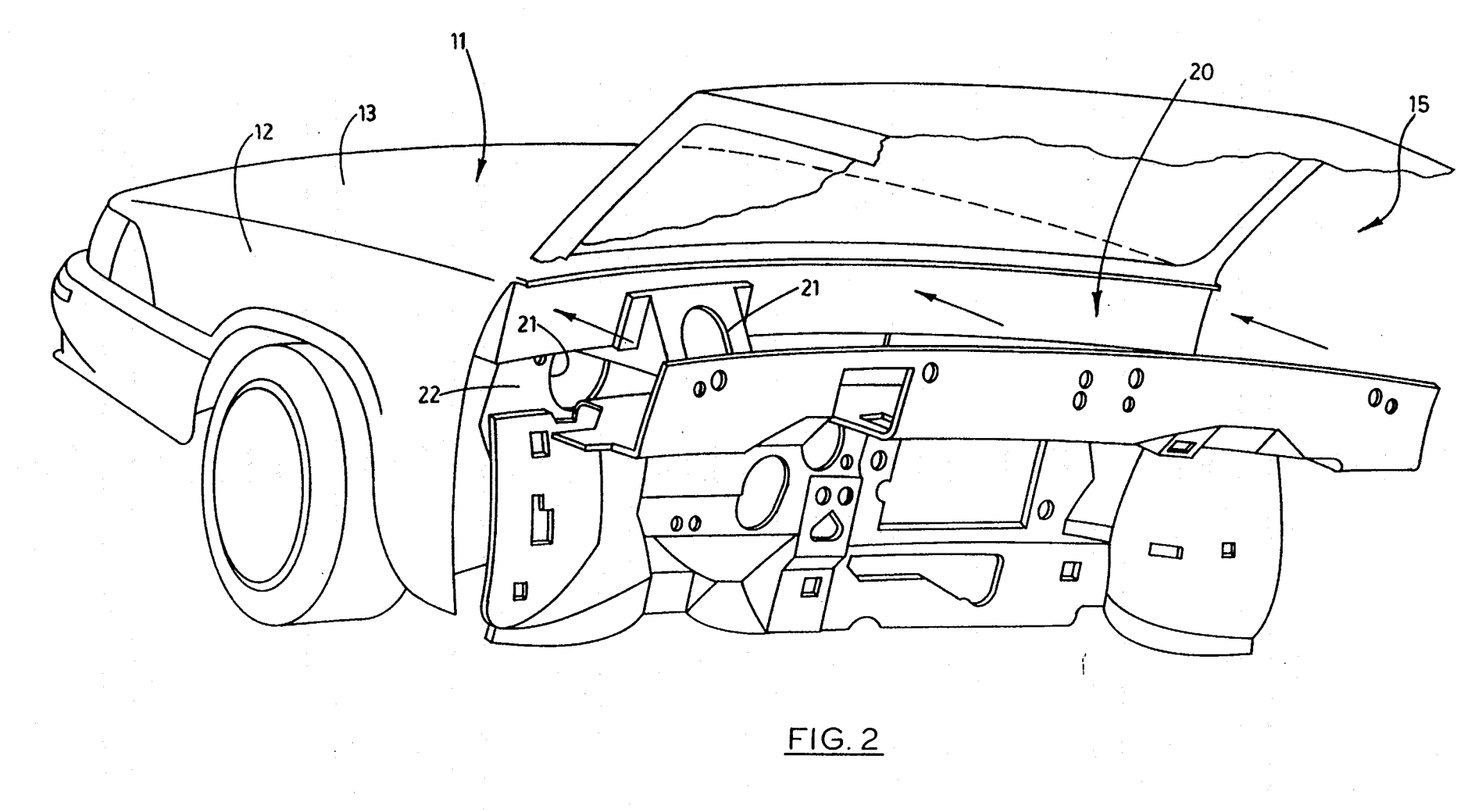
FIG. 2 is a fragmentary, perspective, exploded view of a dash acoustical absorber which is utilized in combination with the improved floor mat of the present invention.

As best illustrated by reference to FIG. 2, a fragmentarily depicted overland vehicle is shown, and wherein the vehicle 11 includes a dash area 20 which has various apertures formed therein for receiving assorted subassemblies. For example, a pair of substantially coaxially aligned apertures 21 are formed in the dash and which are operable to receive the steering column of the vehicle, not shown. Further, the passenger compartment 15 includes a subjacent area which includes the fire wall 22. Similarly, the fire wall has various apertures formed therein for receiving various electrical conduits and assorted subassemblies not shown.

The passenger compartment 15, and more particularly the floor area 16 thereof, includes a tunnel area 23 and which operates as the transmission housing for the engine, not shown. Further, the floor area defines foot wells 24, on opposite sides of the tunnel area, and which support each passenger's feet. Each foot well is defined by an inwardly disposed peripheral edge 25. It should be understood that the overland vehicle 11 has an operator's position 30 which is generally defined by a driver's center-line, and which is depicted by the line labeled 31 in FIG. 8. Furthermore, the operator rests their right foot on the operator's side foot well 24 and along a nominal heel line which is generally labeled by the numeral 32. This is also best seen in FIG. 8.

The first form Of the floor mat of the present invention 10 includes a main body 33 which is defined by a first or forward end 34, and an opposite, second, or rearward end 35. Further, the main body of the floor mat is defined by a forwardly disposed peripheral edge 36 which is disposed in close proximity to the fire wall 22 of the vehicle 11. The main body 33 further has an opposite, or rearwardly disposed peripheral edge 40. Additionally, the main body is defined by an upwardly facing, or top surface 41, and a downwardly disposed, or bottom surface 42. As best understood by study of FIG. 3, the first form of the invention includes a top portion, or first colored vinyl sheet which is generally indicated by the numeral 43, and which is manufactured in a fashion such that it has a color coordinated to the interior colors of the vehicle cabin and a composition which has a low filler content, and a predetermined thickness dimension. As used hereafter, the word "synthetic" shall mean a synthetic polymer which may be manufactured from polyvinylchloride, polypropylene, butylrubber, or other flexible synthetic, moldable materials. The first colored synthetic sheet 43 is joined to a bottom portion, or second synthetic sheet 44. It should be understood that the top and bottom portions 43 and 44, respectively, may be joined together utilizing any number of conventional laminating techniques including coextrusion, adhesive bonding, flame lamination, or fused one to the other by means of conventional heating technology.

Figure 6:
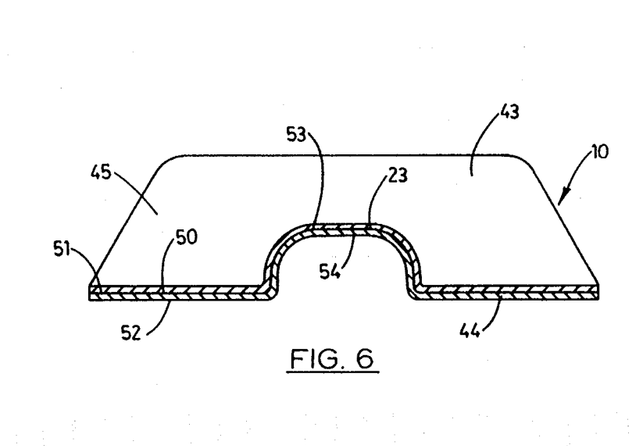
FIG. 6 is a partial, transverse, vertical sectional view taken from a position along line 4B–4B in FIG. 3.

The top portion 43 which operates as a cap sheet, has an outwardly facing, or top surface 45, and an opposed, bottom surface 50. Further, the bottom portion 44 has an upwardly disposed or top surface 51, and an opposed, downwardly or bottom facing surface 52. It should be understood that the bottom surface 50, and the top surface 51 are disposed in juxtaposed relation when the top and bottom portions 43 and 44 are joined together using the fastening techniques discussed above. As best seen by reference to FIG. 6 the top and bottom portions 43 and 44 have individual thickness dimensions 53 and 54. In this regard it should be understood that to achieve the benefits of the first form of the invention the thickness dimension of the bottom portion, or second synthetic sheet must be greater than the first sheet. In this regard, the inventor has discovered that the first form works well when the second sheet is at least twice the thickness of the top portion or first synthetic sheet 43. Therefore, the main body 33 appears to be manufactured from a higher cost synthetic, however, in reality, the flooring system is made of a combination of synthetic that being, a higher grade, thinner, upper cap sheet or top portion, and a lower grade, less expensive, bottom portion. Therefore the entire cost of the floor mat employing this technique will be substantially less than a conventionally manufactured mat having a uniform composition comprised of the more expensive colored synthetic.

Second Form

The second form of the invention is best seen by reference to FIGS. 4 and 5. The second form of the invention includes a floor mat 10 which has a main body 60 having a first end 61 which is disposed in the area adjacent to the fire wall 22, and an opposite, second end 62, which is disposed rearwardly of the passenger compartment 15 and underneath the operator's position 30. The main body 60 is defined by a peripheral edge 63 and further has an upwardly facing or top surface 64, and a downwardly disposed or bottom surface 65. As best seen by reference to FIGS. 4 and 5, the second form of the invention includes top and bottom portions 70 and 71, respectively. The top and bottom portions of the second form are manufactured in a fashion similar to that discussed with respect to the first form of the invention and therefore, for purposes of brevity, are not discussed in further detail herein. It should be understood that the top portion 70 has an upwardly facing surface 72 and a downwardly facing surface 73. Further, the bottom portion 71 has a top surface 74, which is disposed in juxtaposed relation relative to the bottom surface 73, and is otherwise affixed thereto utilizing the fastening techniques discussed earlier. The bottom portion 71 has a bottom facing surface 75 which rests on the floor 16 of the overland vehicle 11.

As best seen by reference to FIG. 4, the top surface 72 includes an inwardly disposed peripheral edge 76. This edge also defines the lowermost peripheral edge of the tunnel area 23. As illustrated, a discrete section of pile carpet 80 is affixed to the tunnel area 23 and is disposed in covering relation relative thereto. The pile carpeting is manufactured utilizing various conventional techniques which are not discussed herein. The pile carpeting 80 includes a top surface 81, and an opposite, bottom facing surface 82 which is disposed in rested relation on the top of the tunnel area 23. It should be understood that the pile carpeting may be affixed to the top surface 72 using conventional fastening techniques such as adhesives, ultrasonic welding, soft-insert molding, or thermal bonding. Further, the pile carpet, which has a peripheral edge 83, may be releasably affixed to the tunnel area 23 by employing hook and loop type fabric fasteners which are appropriately located and respectively affixed on the bottom surface 82 of the pile carpet, and the top surface 72 of the top portion 70 such that they may fixedly mate, one with the other, thereby releasably locating the pile carpet in an appropriate covering relationship relative to the tunnel area. As will be appreciated when this last method of fastening is employed, the second form of the invention provides enhanced flexibility with regards to the floor mat inasmuch as an owner of a vehicle 11 may remove the pile carpeting for cleaning or the like, or alternatively replace the carpeting with various colored carpeting to achieve any desired aesthetic effect. Still further, the second form of the invention may be made in a fashion whereby that part of the top and bottom portions 70 and 71, which cover the tunnel area 23 may be completely absent from the floor mat (not shown). In this situation, the pile carpet 80 is joined directly to the floor mat, by utilizing conventional fastening techniques, at the inwardly disposed peripheral edge of the respective foot wells 76. As will be recognized, additional cost savings are achieved by removing the synthetic which would normally cover the tunnel region 23 and be covered by the pile carpeting.

As best appreciated by a study of the drawings, the carpet 80 has a predetermined surface texture, and the top surface 72, of the top portion 70 has a surface texture or appearance, such that the first synthetic sheet or top surface 72 visually imitates the surface texture of the carpet when it is viewed by a casual observer. In this configuration, the entire floor mat 10 appears to a casual observer to be uniformly carpeted. Therefore, an operator of a vehicle achieves increased benefits by employing the second form of the invention inasmuch as the operator has the convenience of having low maintenance, easy to clean, vinyl disposed in the wheel wells, or high traffic areas of the vehicle 11 where dirt and other debris will normally accumulate, but the floor in general, has the aesthetic appeal of a textured carpet. This, of course, gives an overall appearance of plushness, and softness, which would not normally be attendant with a flooring system which is entirely vinyl. Additionally, and as earlier discussed, there are further benefits to be achieved by utilizing the second form of the invention inasmuch as cost advantages are gained by employing the technique of forming the top and bottom portions 70 and 71 in the fashion as described earlier with respect to the first form of the invention.

Third Form

The third form of the invention is best illustrated by reference to FIG. 5 and includes a main body which is generally indicated by the numeral 90. As should be understood, the main body 90 is formed utilizing conventional manufacturing techniques and will normally have a substantially uniform cross-sectional composition which is derived from synthetic having a moderate filler content, and inexpensive additives which produce the color black, that is, synthetic having a lower relative cost as compared to a colored (other than black) synthetic cap sheet 43. A significant advantage will be gained by utilizing the third form of the invention inasmuch as cost savings will be realized by employing this form of the invention over that of the conventional techniques which have been utilized heretofore.

Figure 7:
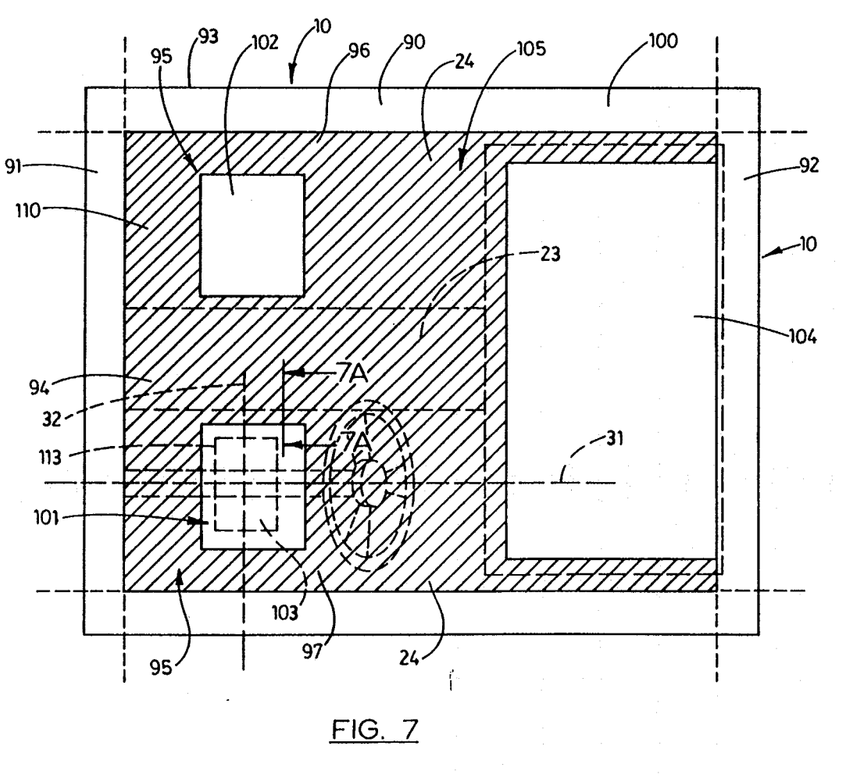
FIG. 7 is a partial, somewhat reduced, plan view of one form of an improved floor mat of the present invention, and showing the approximate sizes and positions of a first, abrasive wear; and second, hidden zones, respectively.
Figure 8:
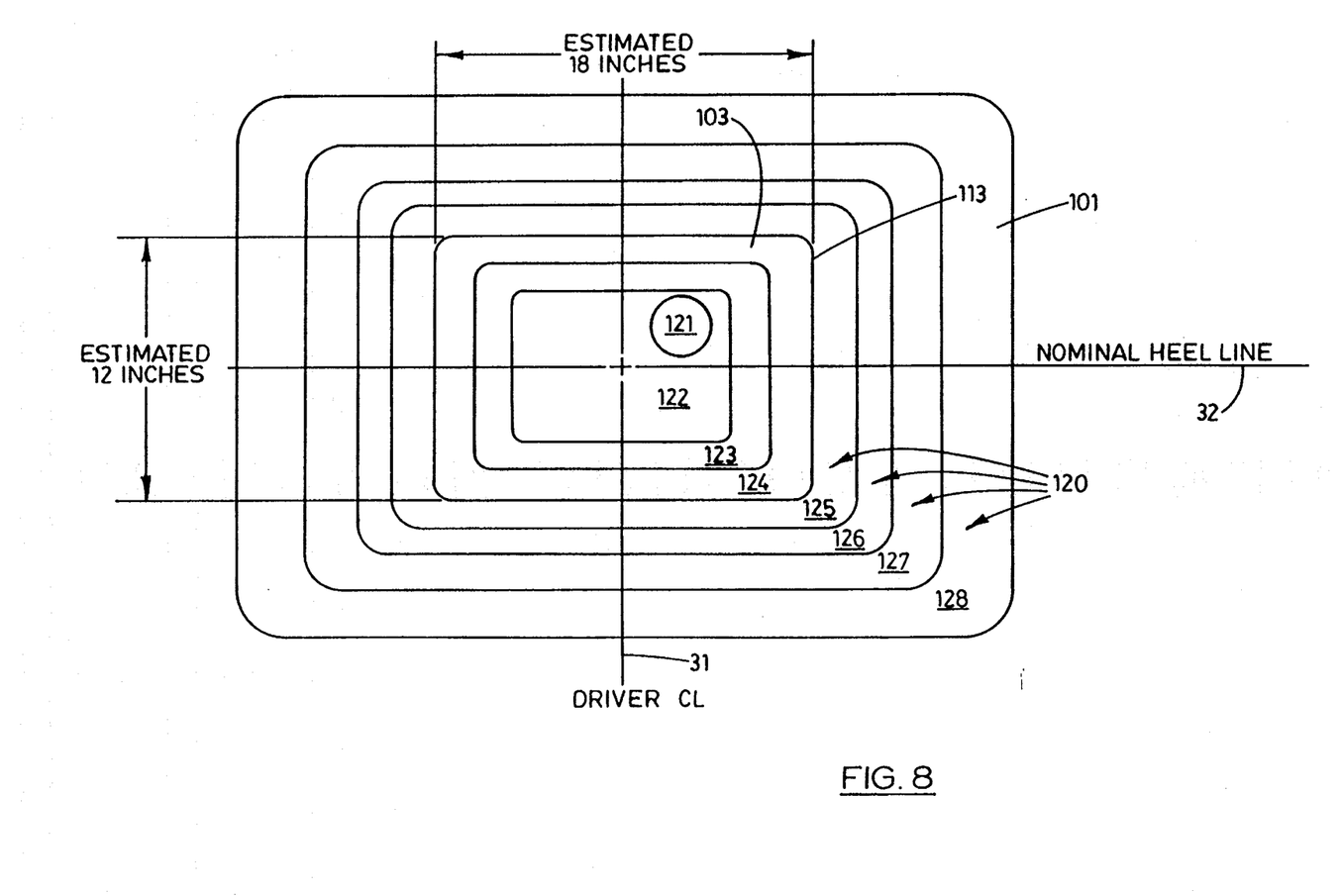
FIG. 8 is a diagrammatic, representation of an abrasive, wear zone of one form of the improved floor mat of the present invention.

As best seen by reference to FIGS. 7 and 8, and as noted, above, the third form of the invention has a main body 90 which includes a first end 91, and an opposite end 92. As will be recognized, the first end 91 is disposed in close proximity to the fire wall 22 of the overland vehicle 11 (not shown). The main body 90 of the floor mat 10 is defined by a peripheral edge 93. The floor mat 90 also includes a tunnel area 94 which substantially covers the transmission housing or tunnel area 23 of the overland vehicle 11, and further includes foot wells which are generally indicated by the numeral 95. As will be recognized, the third form of the invention includes a passenger side foot well 96, and a driver side foot well 97. As best appreciated by a study of FIG. 7, the floor mat 10 has an overall surface area which is slightly greater than the floor area 16 of the vehicle to be covered. Consequently, the floor mat is trimmed to fit the particular vehicle in which it is being installed. In this regard, a trim area 100 is provided which is disposed about the peripheral edge 93. Additionally, the third form of the invention includes, a first foot pad area 101, and a second foot pad area 102. As best seen by reference to FIG. 7, the first foot pad 101 includes a wear area 103 and which is diagrammatically represented in FIG. 8. Further, and as best seen in FIG. 7, the area designated 104 represents that portion of the main body 90 which is disposed immediately underneath the seat of the overland vehicle 11. The remaining shaded area designated by the numeral 105 represents that portion of the main body which has a painted surface 110 applied thereto.

As should be understood, the trim area 100 represents approximately 25% of the surface area of floor mat 10. Additionally, the first and second foot pads 101 and 102 respectively collectively represent about 8% of the surface area of the floor mat. Additionally, the area designated by the numeral 104, and which is positioned underneath the seats of the overland vehicle 11, represents approximately 22% of the surface area of the floor mat 10. Finally, the colored area of the floor mat represents approximately 45% of the surface area of the floor mat.

As earlier discussed, the direct manufacturing expenses of producing a synthetic floor with solid colored PVC throughout the sheet's cross section mat is substantially greater than producing a synthetic floor mat which has a solid black color. To achieve, or realize increased savings, the third form of the invention includes applying a color paint to the surface to the floor mat 10 which has a moderate filler content, thereby creating the appearance of a colored synthetic substrate. To achieve further savings, the painted surface would only be applied in a single coat to the colored area 105, that is, the first coat of paint would be applied to the shaded areas shown in FIG. 7 and the areas defined by the foot pads 101, and 102, respectively, but would not be applied to the perimeter trim area 100, or the area directly underneath the operators seat 104. For vehicles with especially high wear concentration in the first and second foot pad areas, 101 and 102, a second, substantially thicker coat of paint 112 would then be applied to the first and second foot pad areas 101 and 102 respectively. This is best seen by reference to FIG. 7A. By applying a second layer of paint having a thicker cross-sectional dimension, the inventor has provided an effective means to inhibit or otherwise prevent the painted surface from becoming degraded by the action of the frictional engagement of the operator's heel with the surface thereof, thereby removing the paint and exposing the black colored synthetic surface underneath.

As best seen by reference to FIG. 8, the first foot pad 101 is diagrammatically represented, and illustrates a wear area 103 having various zones of wear 120. Wear area 103 is defined by a peripheral edge 113. The zones of wear include a first zone 121; a second zone 122; a third zone 123; a fourth zone 124; a fifth zone 125; a sixth zone 126; a seventh zone 127; and an eighth zone 128. As should be understood, wear zones 1 through 4 experience, as a general matter, the most wear or abrasion with zone 1 being the highest wear area, that is, where the operator's heel normally rests during the operation of the vehicle 11. Zones 2 through 8, of course, experience proportionally less wear, generally speaking, as compared with zone 1. As will be recognized by study of FIG. 8, the approximate length dimension of wear area 103 is 18 inches. Further, the approximate width dimension of the same wear area is 12 inches.

Fourth Form

Figures 9, 10:
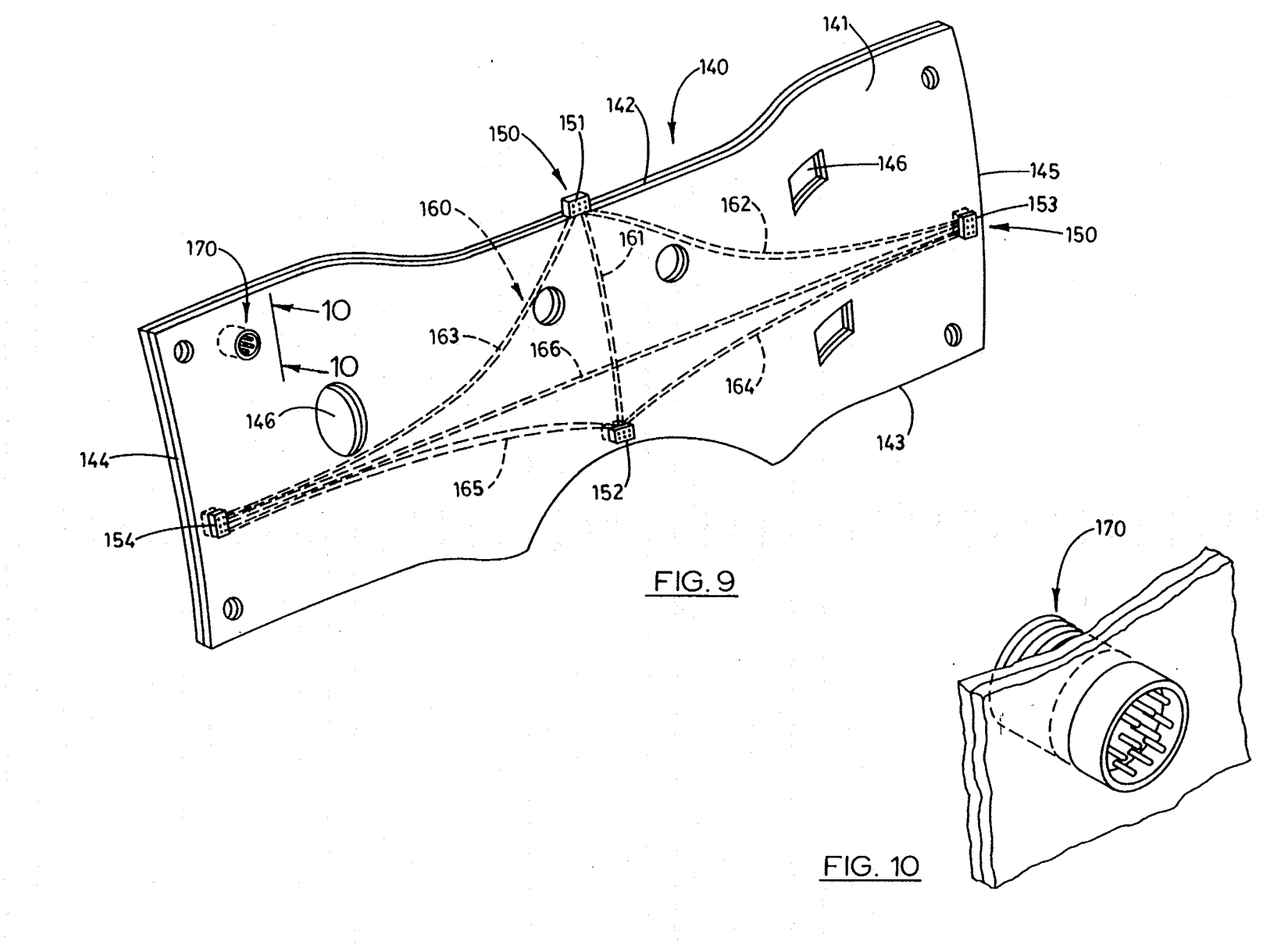
FIG. 9 is a fragmentary, perspective, side elevation view of a dash acoustic absorber which is utilized in combination with the improved floor mat of the present invention, and which includes at least one electrical conduit, and wherein the electrical conduit is shown in hidden lines.
FIG. 10 is a fragmentary, greatly enlarged generally plan view taken from a position along line 10—10 of FIG. 9.

The fourth form of the present invention includes the various teachings, disclosed in the first, second, and third forms of the invention, but further includes an improved acoustic dash absorber assembly which is generally indicated by the numeral 140. As will be appreciated by a study of FIG. 9, the improved dash absorber 140 has a main body 141 which is defined by a top edge 142; a bottom edge 143; which may be releasably affixed to the floor mat 10; a left lateral edge 144; and a right lateral edge 145. As should be understood, apertures 146 having various dimensions, are formed in the dash absorber, thereby permitting conduits and other devices or subassemblies to extend therethrough. The improved acoustic dash absorber 140 has affixed thereto a plurality of multiple pin electrical connectors which are generally indicated by the numeral 150. The electrical connectors 150 are of conventional design and, therefore, for the sake of brevity, are not discussed in further detail herein. As best seen in FIG. 9, the improved dash absorber 140 has first, second, third and fourth connectors which are generally indicated by the numerals 151, 152, 153 and 154 respectively. Extending between, and electrically interconnecting, the individual electrical connectors 151 are a plurality of electrical conduits which are generally indicated by the numeral 160. A first electrical conduit 161 electrically interconnects the first and second electrical connectors 151 and 152, respectively. Further, the second electrical conduit 162 electrically interconnects electrical connectors 151 and 153, respectively. Electrical conduit 163 electrically interconnects electrical connectors 151 and 154, respectively. Electrical conduit 164 electrically interconnects electrical connectors 152 and 153, respectively. Electrical conduit 165 electrically interconnects electrical connectors 152 and 154, respectively, and electrical conduit 166 electrically interconnects electrical connectors 153 and 154, respectively.

A fifth electrical connector and which is generally indicated by the numeral 170 extends substantially through the acoustic dash absorber 140, and is operable to provide a means whereby a wire harness may be electrically connected thereto and connect to other electrical conduits extending therefrom. This connector is best seen by reference to FIG. 10.

Fifth Form

Figure 11:
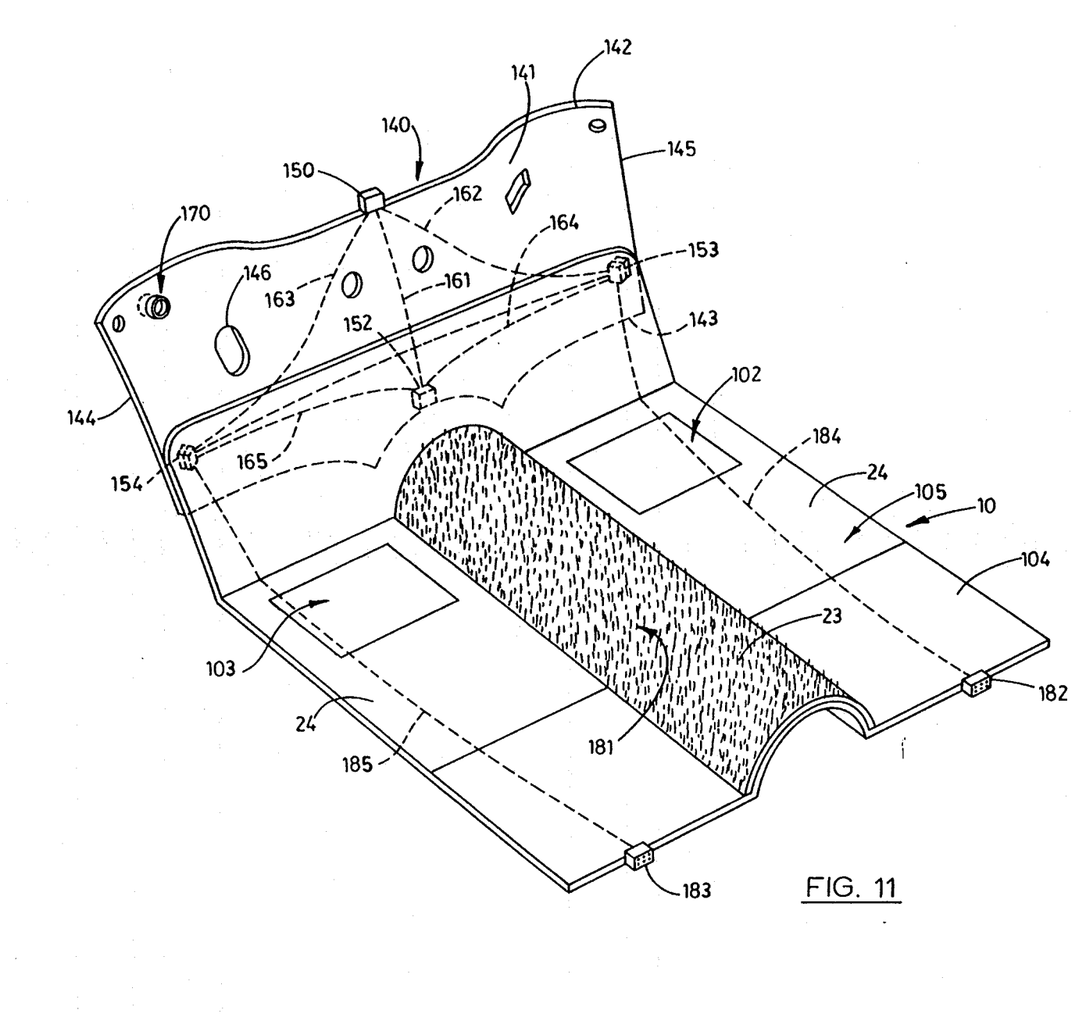
FIG. 11 is a perspective, fragmentary, plan view of one form of the improved floor mat of the present invention, and showing a carpeted tunnel region and an associated floor mat, and wherein a coat of paint is selectively applied to the top surface thereof.

The fifth form of the invention is generally indicated by the numeral 180 in FIG. 11. The fifth form includes a floor mat 10 which has the general characteristics discussed earlier with respect to the first, second, third and fourth forms of the invention. As will be recognized, certain additional features have been incorporated in the fifth form of the invention. For example, the fifth form of the invention includes a discrete piece of pile carpeting 181 which is attached on and otherwise disposed in covering relation relative to the tunnel area 23 of the overland vehicle 11, which is not shown. As should be understood, and as discussed earlier with respect to the earlier forms of the invention, this discrete piece of pile carpeting may be affixed using suitable fastening techniques such as adhesives, or may alternatively be releasably affixed by employing hook and loop type fasteners. Additionally, it should be noted that the fifth form of the invention includes sixth and seventh electrical connectors 182 and 183 respectively. As best seen in FIG. 11, an electrical conduit 184 electrically connects electrical connector 153 with electrical connector 182, and electrical conduit 185 electrically connects electrical connector 154 with electrical connector 183. This, of course, permits electric signals to be transmitted rearwardly of the vehicle without the need of an additional wire harness. As will be recognized by a study of FIG. 11, the floor mat 10 otherwise has the physical features which were discussed earlier with respect to the third and fourth forms of the invention.

Operation

The operation of the described embodiments of the present invention are believed to be readily apparent and are briefly summarized at this point.

As best seen by reference to the FIGS. 3 and 4 the apparatus of the subject invention in the first form includes a first sheet 43 which is formed from a synthetic compound having a predetermined filler content, and wherein the first sheet is defined by a predetermined thickness dimension, a top surface 45 and a bottom surface 50; and a second sheet 44 formed from a synthetic compound having a filler content which is at least twice the filler content of the first sheet and wherein the second sheet is defined by a top surface 51, a bottom surface 52, and a predetermined thickness dimension which is substantially greater than the thickness dimension of the first sheet, and wherein the bottom surface of the first sheet is made integral with the top surface of the second sheet to form a unitary floor covering.

The second form of the invention is substantially identical to the first form of the invention but further includes a discrete section of pile carpeting 80, and wherein the pile carpeting is disposed in covering relationship relative to the tunnel area 23 of the overland vehicle 11. As earlier discussed, this particular pile carpeting may be affixed permanently to the floor mat 10 or, alternatively, it may be releasably affixed thereto by utilizing hook and loop type fasteners 84. Additionally, the texture of the floor mat may be arranged such that it visually simulates the surface texture of the carpet thereby giving the appearance that the entire floor covering is carpeted, when, in reality, only the tunnel area 23 is carpeted.

Figure 7A:
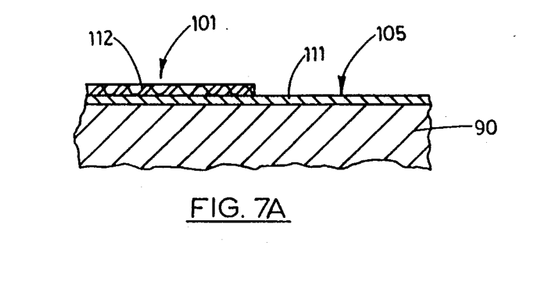
FIG. 7A is a partial, greatly exaggerated, vertical sectional view taken from a position along line 7A–7A in FIG. 7.

The third form of the invention, and which is best illustrated by reference to figures to 7 and 7A, relates to a floor covering which is manufactured from synthetic having a moderate fill content and which further has a colored coating, such as a coat of paint 110, which is selectively applied thereto. As earlier discussed, by utilizing a moderate filler content synthetic substrate, and a painted surface, advantages may be gained relative to the cost of manufacturing a floor mat which would be fabricated from colored synthetic which is substantially much more expensive, relatively speaking.

As best seen by reference to FIG. 10, the fourth form of the invention relates to an improved acoustical dash absorber 140 which is utilized in combination with the other forms of the invention. The acoustical absorber includes a plurality of multiple-pin electrical connectors 15 and electrical conduits 160 which extend therebetween, thus providing a convenient means whereby electrical subassemblies may be electrically joined or linked, one to the other, without the addition of unduly complex wire harnesses to the dash area.

The fifth form of the invention is depicted in numeral 11 and wherein a floor mat similar to that illustrated in the second and third forms of the invention are shown in combination with the fourth form of the invention, thereby providing an integrated flooring system for an overland vehicle 11 or the like.

Therefore, the improved floor mat of the present invention can be employed in a wide variety of operative environments, can be manufactured and purchased at moderate cost when compared with related practices and devices, and further is highly efficient in operation and reduces to an absolute minimum the problems associated with prior manufacturing procedures and other processes which have been utilized heretofore in the fabrication of flooring systems for overland vehicles.

Although the invention has been herein shown and described in what is conceived to be the most practical and preferred embodiments, it is recognized that departures may be made therefrom within the scope of the invention which is not to be limited to the illustrative details disclosed.

Having described my invention, what I claim as new and desire to secure by letters patent of the United States is:

1. A floor covering for an overland vehicle having a passenger compartment and a predetermined floor area having a tunnel area, the floor covering comprising:
   a first sheet formed from a polymeric based compound having a predetermined filler content, wherein the first sheet is defined by a predetermined thickness dimension, an exposed top surface, and a bottom surface; and
   a second sheet formed from a polymeric based compound having a filler content which is greater than the filler content of the first sheet, wherein the second sheet is defined by a top surface, a bottom surface, and a predetermined thickness dimension which is greater than the thickness dimension of the first sheet, and wherein the bottom surface of the first sheet is made integral with the top surface of the second sheet to form a unitary floor covering which is capable of resting on the floor area; and a tunnel region which is capable of covering the tunnel area of the vehicle, the tunnel region of the floor covering having a carpet fixedly attached thereon.

2. A floor covering as claimed in claim 1, wherein the first and second sheets are formed substantially simultaneously by coextrusion.

3. A floor covering as claimed in claim 1, wherein the first and second sheets are adhesively bonded together.

4. A floor covering as claimed in claim 1, wherein the first and second sheets are fused together.

5. A floor covering as claimed in claim 1, wherein the first and second sheets have predetermined colors and wherein the color of the first sheet is different from that of the second sheet.

6. A floor covering as claimed in claim 1, wherein the carpet has a predetermined surface texture and the exposed top surface of the first sheet visually simulates the surface texture of the carpet such that the entire floor mat texture appears substantially uniform.

7. A floor covering as claimed in claim 1, wherein a dash absorber is made integral with the floor mat.

8. A floor covering, as claimed in claim 1, wherein an electrical conduit is made integral with the floor covering.

9. A floor covering, as claimed in claim 7, wherein an electrical conduit is made integral with the dash absorber.

10. A floor covering for an overland vehicle, the overland vehicle including a passenger compartment and a floor area having a tunnel area which defines a transmission housing, the floor covering comprising:

a first sheet having an exposed top surface and a bottom surface, and wherein the first sheet is formed from a polymeric based composition having a predetermined filler content, the first sheet including a tunnel region which is capable of covering the tunnel area of the vehicle, and wherein the first sheet is defined by a predetermined thickness dimension;

a second sheet having a top surface and a bottom surface, wherein the second sheet is formed from a polymeric based composition having a filler content which is greater than the filler content of the first sheet, the second sheet including a tunnel region which corresponds to the tunnel area of the first sheet, and wherein the second sheet is defined by a predetermined thickness dimension which is at least twice the thickness dimension of the first sheet; and a carpet fixedly attached on the tunnel region of the first sheet and having a predetermined surface texture and a peripheral edge which does not extend beyond the tunnel region of the first sheet wherein the bottom surface of the first sheet is made integral with the top surface of the second sheet to form a unitary floor covering, and wherein the exposed top surface of the first sheet has an appearance which visually imitates the surface texture of the carpet such that the entire floor covering appears to be uniform.

11. A floor covering system for an overland vehicle as claimed in claim 10, wherein a dash absorber is made integral with the floor covering system.

12. A floor covering system for an overland vehicle as claimed in claim 10, wherein an electrical conduit is made integral with the floor covering system.

13. A floor covering system for an overland vehicle as claimed in claim 11, wherein an electrical conduit is made integral with the dash absorber.

14. A floor covering for an overland vehicle having a passenger compartment and a predetermined floor area, the floor covering consisting essentially of:

a first sheet formed from a polymeric-based compound having a predetermined filler content and a predetermined color created by a color additive, and wherein the first sheet has a predetermined thickness dimension, an exposed top surface, and a bottom surface; and a second sheet formed from a polymeric-based compound having a filler content which is greater than the filler content of the first sheet, and wherein the second sheet has a top surface, a bottom surface, and a predetermined thickness dimension which is greater than the thickness dimension of the first sheet, wherein the bottom surface of the first sheet is in direct contact with and made integral with the top surface of the second sheet to form a unitary floor covering which is capable of resting on the floor area.

15. A floor covering for an overland vehicle having a passenger compartment and a predetermined floor area having a tunnel area, the floor covering comprising:

first, second, third, and fourth peripheral edges, the first peripheral edge disposed in a position opposite to the third peripheral edge and the second peripheral edge disposed in a position opposite to the fourth peripheral edge;

a forward portion having a tunnel region centrally disposed about a midpoint which is oriented between the second and fourth peripheral edges;

a first sheet formed from a polymeric-based compound having a predetermined filler content and a predetermined color created by a color additive, and wherein the first sheet has a predetermined thickness dimension, an exposed top surface, a tunnel region capable of resting over the tunnel area of the vehicle, and a bottom surface; and a second sheet formed from a polymeric-based compound having a filler content which is greater than the filler content of the first sheet, and wherein the second sheet is black in color and has a top surface, a tunnel region corresponding to the tunnel region of the first sheet, a bottom surface, and a predetermined thickness dimension which is at least twice the thickness dimension of the first sheet, and wherein the bottom surface of the first sheet is made integral with the top surface of the second sheet to form a unitary floor covering which is capable of resting in covering relation relative to the entire floor area; and a carpet having a predetermined surface texture, fixedly attached on the top surface of the tunnel region of the first sheet, and having a peripheral edge with does not extend beyond the tunnel region of the first sheet, and wherein the exposed top surface of the first sheet has an appearance which visually simulates the surface texture of the carpet such that the entire floor covering appears to be uniform.

* * * * *